US006706340B2

(12) United States Patent
Yoshino et al.

(10) Patent No.: US 6,706,340 B2
(45) Date of Patent: Mar. 16, 2004

(54) RECORDING MEDIUM, PROCESS FOR PRODUCTION THEREOF, AND IMAGE-FORMING METHOD EMPLOYING THE RECORDING MEDIUM

(75) Inventors: Hitoshi Yoshino, Kanagawa (JP); Hiroyuki Ogino, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 09/987,294

(22) Filed: Nov. 14, 2001

(65) Prior Publication Data

US 2002/0089578 A1 Jul. 11, 2002

(30) Foreign Application Priority Data

Nov. 17, 2000 (JP) ...................................... 2000-351732

(51) Int. Cl.$^{7}$ ................................................ B32B 3/00

(52) U.S. Cl. ................................ 428/32.21; 428/32.29; 428/32.34; 162/135; 162/141; 162/149; 162/164.6; 162/181.4

(58) Field of Search ........................... 428/32.16, 32.34, 428/32.21, 32.29; 162/135, 141, 149, 164.6, 181.4

(56) References Cited

U.S. PATENT DOCUMENTS 4,269,891 A 5/1981 Minagawa .................. 428/335
4,433,048 A 2/1984 Solberg et al. ............. 430/434
4,442,172 A 4/1984 Oshima et al. ............. 428/342
4,723,129 A 2/1988 Endo et al. .................. 346/1.1
4,734,336 A 3/1988 Oliver et al. ............ 428/537.5
5,032,225 A 7/1991 Saji et al. ................... 162/135
5,180,624 A 1/1993 Kojima et al. .............. 428/211
5,496,626 A 3/1996 Hamajima et al. .......... 428/284
5,635,291 A 6/1997 Yoshino et al. .......... 428/304.4
5,679,451 A 10/1997 Kondo et al. ............ 428/304.4
5,707,716 A 1/1998 Yoshino et al. ............. 428/212
5,849,447 A 12/1998 Matsuda ...................... 430/97
5,955,142 A 9/1999 Yoshino et al. ............. 427/205
5,955,185 A 9/1999 Yoshino et al. .......... 428/304.4
5,965,252 A 10/1999 Santo et al. ................ 428/329
6,177,188 B1 1/2001 Ichioka et al. .............. 428/342
6,391,440 B1 * 5/2002 Yoshino et al. ............. 428/342
6,475,601 B1 * 11/2002 Sakaki et al. ............... 428/195
2003/0064200 A1 * 4/2003 Yoshino et al. ............. 428/195

FOREIGN PATENT DOCUMENTS

DE 40 37 870 A1 5/1991
EP 0 701 904 A1 3/1996
EP 0 736 392 A1 10/1996
EP 0 749 845 A2 12/1996
EP 0 750 067 A2 * 12/1996
EP 0 967 088 A2 12/1999
EP 1 002 656 A2 5/2000
GB 2 147 003 A 5/1985
JP 51-38298 A 3/1976
JP 53-49113 A 5/1978
JP 54-59936 A 5/1979
JP 55-5830 A 1/1980
JP 54-51583 A 4/1980
JP 56-120508 A 9/1981

(List continued on next page.)

OTHER PUBLICATIONS

Josef Roček et al., "Porous Structure of Aluminium Hydroxide and Its Content of Pseudoboehmite", Applied Catalysis, 74 (1991) pp. 29–36.

*Primary Examiner*—Cynthia H. Kelly
*Assistant Examiner*—B. Shewareged
(74) *Attorney, Agent, or Firm*—Fitzpatrick, Cella, Harper & Scinto

(57) ABSTRACT

A recording medium having a non-sized single-layer fibrous structure which is composed mainly of a fibrous material and contains no filler and employing a face of the single-layer fibrous structure as an ink-receiving face, wherein alumina hydrate of a boehmite structure and a cationic resin are present at least near the surface of the fibrous material.

19 Claims, 1 Drawing Sheet

FOREIGN PATENT DOCUMENTS

| | | | |
|---|---|---|---|
| JP | 58-8685 | A | 1/1983 |
| JP | 63-118287 | A | 5/1988 |
| JP | 64-78877 | A | 3/1989 |
| JP | 1-141783 | A | 6/1989 |
| JP | 2-243381 | A | 9/1990 |
| JP | 2-243382 | A | 9/1990 |
| JP | 4-202011 | A | 7/1992 |
| JP | 5-16015 | A | 3/1993 |
| JP | 5-106197 | A | 4/1993 |
| JP | 6-219043 | A | 8/1994 |
| JP | 6-287886 | A | 10/1994 |
| JP | 6-312572 | A | 11/1994 |
| JP | 7-5430 | A | 1/1995 |
| JP | 7-25131 | A | 1/1995 |
| JP | 7-25132 | A | 1/1995 |
| JP | 8-132731 | A | 5/1996 |
| JP | 8-174993 | A | 7/1996 |
| JP | 8-258400 | A | 10/1996 |
| JP | 9-6664 | | 1/1997 |
| JP | 9-76628 | A | 3/1997 |
| JP | 9-86035 | A | 3/1997 |
| JP | 9-99627 | A | 4/1997 |
| JP | 9-170190 | A | 6/1997 |
| JP | 2714350 | B2 | 2/1998 |
| JP | 2714351 | B2 | 2/1998 |
| JP | 2714352 | B2 | 2/1998 |
| JP | 11-174718 | A | 7/1999 |
| JP | 2000-79755 | A | 3/2000 |
| JP | 2000-211250 | A | 8/2000 |

* cited by examiner

FIGURE
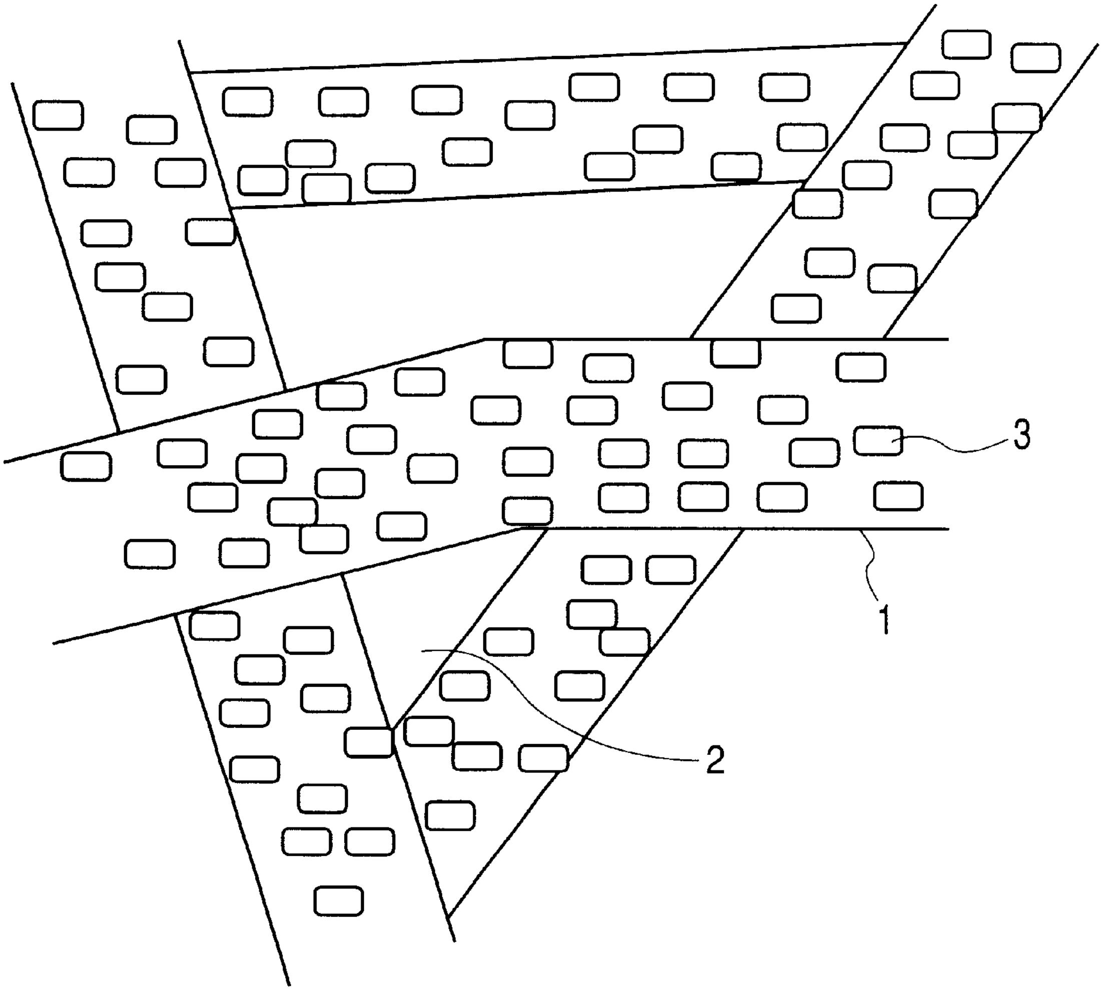

RECORDING MEDIUM, PROCESS FOR PRODUCTION THEREOF, AND IMAGE-FORMING METHOD EMPLOYING THE RECORDING MEDIUM

BACKGROUND OF THE INVENTION

1. Field of the Invention

The present invention relates to a recording medium suitable for recording with an ink, the recording medium having excellent ink absorbency, retaining the feeling of plain paper on the surface, and giving a high image density and a clear color tone. The present invention also relates to a process for producing the recording medium, and an image-forming method employing the recording medium.

2. Related Background Art

The ink-jet recording system records picture images and letters by ejecting fine ink droplets onto a recording medium like a paper sheet by a variety of principles for the ejection. The ink-jet recording system has features of high speed printing with low noise, ease of multicolor printing, flexibility in recorded pattern, needlessness of development and fixation of images, and so forth. Therefore, ink-jet recording systems have come to be employed widely as an image forming apparatus for information recording and other application fields.

Furthermore, the image formed by a multicolor ink-jet system can be comparable to the images formed by multicolor gravure printing or color photography, and is less costly in preparing a small number of print copies, so that the ink-jet recording systems are coming to be employed also in full color recording.

In ink-jet recording, the recording apparatuses and the recording methods have been improved for a higher recording speed, higher fineness, and full-color printing. With the improvement, the recording medium therefor is also required to have higher level properties.

Hitherto, various types of recording mediums have been disclosed to meet the above requirements. For example, Japanese Patent Application Laid-Open No. 55-5830 discloses an ink-jet recording paper sheet having an ink-absorbent coating layer provided on the surface of a supporting material. Japanese Patent Application Laid-Open No. 55-51583 discloses use of amorphous silica as a pigment in the coating layer. These recording mediums have, on a base material, an ink-receiving layer containing a pigment like alumina or silica. However, these recording medium cannot give a feeling of plain paper even though paper is used as the base material, owing to the ink-receiving layer formed on the base material.

Techniques are disclosed for obtaining a recording medium having the feeling of plain paper. Japanese Patent Application Laid-Open Nos. 6-312572, 7-25131, and 7-25132, for example, disclose recording mediums in which a paper base material is coated with a small amount of ultra-fine particles to keep the pulp fiber form on the recording face at a coverage of 70% or more by the ultra-fine particles. As another type of recording medium, for example, Japanese Patent Application Laid-Open No. 1-141783 discloses an ink-jet recording paper sheet coated with amorphous silica and alumina hydrate by machine coating, and Japanese Patent Application Laid-Open No. 11-174718 discloses a pigment-sized information-recording paper sheet.

On the other hand, recording paper sheets containing a filler or the like are also proposed. For example, Japanese Patent Application Laid-Open No. 53-49113 discloses a recording paper sheet which contains powdery urea-formalin resin internally and is coated and impregnated with a water-soluble polymer. Japanese Patent Application Laid-Open No. 58-8685 discloses a recording paper sheet which internally contains a synthetic silicate and glass fiber and is coated and impregnated with a water-soluble polymer. These techniques improves the ink absorbency of a non-sized paper sheet by incorporation of a fine powdery material.

As another type of the internally filled paper sheet, multilayered paper sheets are disclosed. For example, Japanese Patent Application Laid-Open No. 63-118287 and U.S. Pat. No. 4,734,336 disclose uncoated paper sheets of the laminated structure of a supporting layer composed of pulp fiber and a surface layer composed of a filler like silica and a fibrous material. Japanese Patent Application Laid-Open Nos. 1-78877, 2-243381, 2-243382, and 5-106197 disclose multilayered recording paper sheets, produced by combination-machining, with sizing on the base layer or on the interface between the base layer and the surface layer. Japanese Patent Application Laid-Open No. 6-219043 discloses a multilayered paper sheet carrying a slightly water-soluble or water-insoluble inorganic matter in the surface layer. Japanese Patent Application Laid-Open Nos. 6-287886, 7-5430, and 8-258400 disclose multilayered paper sheets employing a specified pulp such as bulky cellulose, mercerized cellulose, and bleached hardwood sulfite pulp. Japanese Patent Application Laid-Open No. 9-170190 discloses a multilayered paper sheet comprising a surface layer composed mainly of a hydrophilic fiber and a hydrophobic fiber and a base layer composed mainly of a cellulose fiber.

However, in high speed printing, conventional recording mediums cannot satisfy all the requirements for high ink absorbency, high color development density, less ink-feathering, and so forth.

SUMMARY OF THE INVENTION

An object of the present invention is to provide a recording medium suitable especially for ink-jet recording, the recording medium having excellent ink absorbency, retaining the feeling of plain paper on the surface, giving a high image density and a clear color tone. Other objects of the present invention are to provide a process for producing the recording medium, and to provide an image-forming method employing the recording medium.

The present invention has been made to solve the above problems, and intends to provide a recording medium which has high ink-absorbency, causes less dusting and less curling, having a feeling of plain paper on the surface, and is capable of giving high image density and giving a clear color tone, and is suitable especially for ink-jet recording; and also to provide a process for producing the recording medium, and an image-forming method employing the recording medium.

The above objects are accomplished by the present invention as described below. The recording medium of the present invention has a non-sized single-layer fibrous structure which is composed mainly of a fibrous material and contains no filler, and employs a face of the single-layer fibrous structure as an ink-receiving face, wherein alumina hydrate of a boehmite structure and a cationic resin are present at least near the surface of the fibrous material.

The process for producing the recording medium of the present invention comprises a step of applying alumina hydrate having a boehmite structure and a cationic resin onto a base material having a single-layer fibrous structure mainly composed of a fibrous material and containing no filler.

The image-forming method of the present invention is such an image-forming method for printing an image by applying ink droplets onto an ink-receiving face of the recording medium, wherein the recording medium having the aforementioned constitution is employed as the recording medium.

The present invention provides a recording medium which has high ink-absorbency, causing less dusting and less curling, retaining a feeling of plain paper on the surface, and being capable of giving high image density and giving a clear color tone. This recording medium is suitable for recording by application of ink, especially for ink-jet recording to obtain a recorded image with a high image recording density and a clear color tone by retaining the feeling of plain paper.

BRIEF DESCRIPTION OF THE DRAWING

The accompanying FIGURE schematically illustrates the condition of the surface of the recording medium of the present invention.

DESCRIPTION OF THE PREFERRED EMBODIMENTS

The inventors of the present invention disclosed a recording medium composed of a fibrous material and containing alumina hydrate internally (e.g., Japanese Patent Nos. 2714350-2714352, and Japanese Patent Application Laid-Open Nos. 9-99627 and 2000-211250). Of these, the recording mediums disclosed in Japanese Patent Nos. 2714350-2714352 and Japanese Patent Application Laid-Open No. 9-99627 internally contain an alumina hydrate having specific physical properties throughout the entire fibrous material. The present invention has been made based on the findings that excellent color development can be achieved by the constitution of the above disclosure. The recording medium disclosed in Japanese Patent Application Laid-Open No. 2000-211250 is a multi-layered paper medium comprising a surface layer and a base layer with the surface layer only containing an alumina hydrate of a boehmite structure internally. This recording medium of the above disclosure was provided based on the findings that high-speed printing with excellent color developability and excellent image resolution can be achieved by the alumina-hydrate-containing recording paper sheet of a multi-layer structure in which only a surface layer contains alumina hydrate internally and a base layer is composed of a material having a high liquid absorbency.

The present invention has been achieved by the improvement of the above-mentioned inventions. The inventors of the present invention found that excellent ink absorbency, excellent color developability, and excellent dot reproducibility can be achieved by an improved alumina-hydrate-containing recording medium which comprises a non-sized recording medium of a single-layer structure formed from a fibrous material without a filler and containing an alumina hydrate and a cationic resin on or near the surface of the fibrous material. The present invention has been made based on such findings.

The recording medium of the present invention is especially useful for printing with a super-high speed printer employing a full-line head, or the like. In a more preferred embodiment of the recording medium of the present invention, the alumina hydrate and the cationic resin are applied onto a non-sized paper sheet by on-machine coating. The recording medium of the present invention has a single-layer structure, and contains the alumina hydrate and the cationic resin applied by on-machine coating. Therefore, the recording medium can be produced readily with a conventional paper machine with improved productivity, advantageously. In particular, the alumina hydrate and the cationic resin can readily be applied on the both faces of the base material sheet, advantageously. In the present invention, the fibrous material is not limited to paper, and includes fibrous materials such as synthetic paper made from a synthetic pulp, cloth, or a nonwoven fabric. Here, the non-sized paper sheet means the one which has a Stöckigt sizing degree of zero second. The Stöckigt sizing degree can be measured according to JIS P-8122.

The recording medium of the present invention comprises a single layer mainly composed of a fiber containing no filler, and contains the alumina hydrate and the cationic resin at least near the surface of the non-sized fibrous material. With the recording medium of the present invention, the colorant in the applied ink is adsorbed near the ink-receiving face of the recording medium, and the solvent component of the ink is absorbed into the recording medium. Preferably, the alumina hydrate, the cationic resin, and other additives do not occupy the interstices between the fibers. The absence of the additive in the interstices between the fibers of the fibrous material can be confirmed by observation of the recording medium surface by a scanning electronic microscope as described in Japanese Patent Application Laid-Open Nos. 6-312572, 7-25131, and 7-25132. The magnification ratio for the microscopic observation ranges preferably from 200 to 500. In the present invention, the interstices in the fibrous material are preferably kept to remain to achieve the maximum ink absorption in ink-jet recording. For this purpose, the absence of the filler in the interstices is important. Further, in the present invention, the coating with a resin material such as surface size-press is not conducted, which is different from usual paper or cloth. In the recording medium of the present invention, as shown in FIGURE, alumina hydrate 3 and a cationic resin adhere to a fiber 1 to coat the surface of the fiber. Preferably, the alumina hydrate and the cationic resin do not fill the interstice 2 in the fibrous material.

In the present invention, the alumina hydrate and the cationic resin are preferably allowed to be present at least near the surface of the ink-receiving face of the single-layer fibrous structure mainly composed of a fibrous material. The alumina hydrate and the cationic resin can be added internally to the recording medium base material having a single-layer structure, or be added by coating or impregnation of these materials on or into the prescribed face of the base material. Preferably the alumina hydrate and the cationic resin are applied by coating onto the recording medium base material or impregnated thereto. The coating method enables presence of a larger amount of the alumina hydrate and the cationic resin near the surface of the recording medium, resulting in improvement of color development. More preferably the alumina hydrate and the cationic resin are applied by on-machine coating. The reason therefor is not clear. Presumably, in the on-machine coating, the fibrous material such as paper immediately after the sheet making has high chemical and physical activities to activate the contacting alumina hydrate or the cationic resin; or the alumina hydrate or the cationic resin adheres in a shorter time after application onto the fibrous material to retard the penetration of the coating liquid into the interior of the base material.

The respective coating weights for the coating of the recording medium sheet preferably ranges from 1 to 5 $g/m^2$ on one face of the sheet. In the on-machine coating, both faces of the sheet are simultaneously coated. In this case, the total coating weights of the alumina hydrate and the cationic resin are respectively in the range from 2 to 10 $g/m^2$ in total of the both faces. Within this range, the alumina hydrate and the cationic resin can secure the suitable interstices between the fibers. Furthermore, the on-machine coating achieves excellent color development with a less coating weight with retention of the feeling of the plain paper.

The term "feeling" of the plain paper herein means a bared state of the fiber of the fibrous material on the surface and absence of the hand-touch feeling of fine particle coating. The term "on-machine coating" herein means continuous application of a coating liquid containing the alumina hydrate and the cationic resin onto the fibrous material in the sheet-making machine in place of the usual application of a resinous material in a size-pressing step in the paper-making process. Therefore, the recording medium of the present invention does not have a size-pressed layer on the surface thereof.

Japanese Patent Application Laid-Open No. 1-141783 discloses an ink-jet recording paper sheet produced by application of a coating liquid containing amorphous silica and alumina hydrate having an average particle size of 5 to 200 nm in a mixing weight ratio from 100:5 to 100:35 onto a supporting material by on-machine coating. In this disclosure, an alumina sol is used as a binder for the amorphous silica to be applied for the purpose of improvement of productivity in the on-machine coating on a paper machine. The above recording paper sheet is similar, in the on-machine coating, to the recording medium of the present invention, but is different in the constitution from the present invention in which a non-sized paper sheet containing no filler is on-machine coated with the alumina hydrate and the cationic resin.

Japanese Patent Application Laid-Open No. 11-174718 discloses an information paper sheet onto which a pigment sizing coat has been applied at a coating weight of 3 to 8 $g/m^2$, having a finished sheet density of 0.75 to 0.90 $g/cm^3$, a fiber orientation ratio of 1.05 to 1.25, a smoothness of 50 to 120 seconds, and a formation index of not less than 20. In this disclosure, the pigment sizing coat is applied to prevent penetration of a fixed toner into the interstices of the paper, when the density of the paper is decreased in order to reduce the basis weight in full color copying while maintaining good color images with retention of the rigidity. This paper sheet is similar to the present invention in that the pigment sizing coat is applied on a specified paper sheet. However, this Japanese Patent Application Laid-Open No. 11-174718 does not describe the idea of on-machine coating with alumina hydrate and a cationic resin of an unfilled paper sheet to satisfy the properties of ink absorbency, color developability, and plain paper feeling as the present invention.

The alumina hydrate, which has positive charges, gives high fixability of a colorant such as a dye of the ink, enabling image formation with high color developability, and not causing browning or low light-fastness of a black ink, advantageously. Therefore, the recording medium containing alumina hydrate is suitable for ink-jet recording.

The alumina hydrate to be contained in the recording medium of the present invention more preferably has a boehmite structure (detectable by X-ray diffraction) due to excellent ink absorbency, colorant adsorbency, and color developability.

The alumina hydrate is defined by the general formula below:

$$Al_2O_{3-n}(OH)_{2n}\cdot mH_2O$$

where n is an integer from 0 to 3; and m is a number of from 0 to 10, preferably from 0 to 5. The expression of $mH_2O$ represents a releasable water phase usually not contributing the formation of the crystal lattice. Therefore, the number m can be not an integer. The numbers m and n cannot simultaneously be zero.

The crystal of alumina hydrate of a boehmite structure is a laminar compound having the (020) plane forming a giant plane, showing a characteristic diffraction peak in the X-ray diffraction pattern. The boehmite structure includes a perfect boehmite structure, and a pseudo-boehmite structure which contains excess water between the layers of the (020) planes. This pseudo-boehmite structure has a diffraction peak which is broader than that of the perfect boehmite structure in the X-ray diffraction pattern. The perfect boehmite and the pseudo-boehmite are not clearly distinguishable from each other. Therefore, in the present invention, the alumina hydrate includes the both boehmite structures (hereinafter simply referred to as "alumina hydrate"), unless otherwise mentioned.

The alumina hydrate of the boehmite structure employed in the present invention is preferably those showing a boehmite structure in X-ray diffraction pattern in view of the color density, resolution, and ink absorbency. An alumina hydrate containing a metal compound such as titanium dioxide and silica can be used, provided that the alumina hydrate has a boehmite structure.

The process for producing the alumina hydrate for use in the present invention is not specially limited. Any known process such as a aluminum hydroxide hydrolysis process and a sodium aluminate hydrolysis process may be applicable, provided that the process produces the alumina hydrate of a boehmite structure. Otherwise, an amorphous alumina hydrate as observed by X-ray diffraction may be useful by changing its structure into a boehmite structure by heating at a temperature of 50° C. or higher in the presence of water as described in Japanese Patent Application Laid-Open No. 56-120508.

The non-sized base material having a single-layer fibrous structure constituting the recording medium of the present invention can be obtained from a fibrous material not having been sized as the main component. As the fibrous material, cellulose pulp is useful.

The specific examples of the base material include chemical pulp such as sulphite pulp (SP), alkali pulp (AP), and kraft pulp (KP); semichemical pulp; semimechanical pulp; and mechanical pulp, obtained from hardwood or softwood; and waste paper stock which is a deinked secondary fiber. The pulp may be unbleached pulp or bleached pulp, or beaten pulp or unbeaten pulp. The cellulose pulp also includes non-wood pulp derived from grass fiber, leaf fiber, bast fiber, seed fiber, or the like: such as pulp derived from bamboo, hemp, bagasse, kenaf, paper bush, cotton linter, or the like. In the present invention the material should not contain a filler. The material preferably contains no water-absorbing resin like polyvinyl alcohol and polyacrylamide. The absence of the filler and the water-absorbing resin results in high reproducibility of the printed dots.

The basis weight of the recording medium as a whole is not specially limited unless the basis weight is small to make the recording medium extremely thin. The basis weight is preferably in the range from 40 to 300 $g/m^2$ in view of the delivery of the recording medium in a printer. More preferably the basis weight is in the range from 45 to 200 g/m$^2$. Within this basis weight range, the opacity can be raised without increasing the folding strength of the sheet, and can retard the sticking of the piled printed sheets.

To the recording medium of the present invention, is preferably added fine fibrillated cellulose; crystallized cellulose; sulfate pulp, sulfite pulp, or soda pulp derived from hardwood or softwood; hemicellulase-treated pulp; or enzyme-treated chemical pulp in addition to the aforementioned cellulose pulp. The supplemental addition of such a pulp can effectively improve the surface smoothness, or the formation of the recording medium, or can prevent surface tacking or surface swelling of the recording medium immediately after printing.

In the present invention, a mechanical pulp such as bulky cellulose fiber, mercerized cellulose, fluffed cellulose, and thermomechanical pulp may be used in addition to the aforementioned cellulose pulp. The supplemental addition of such a pulp can improve the ink absorption speed and ink absorbency of the recording medium.

The ink absorption speed of the recording medium in the present invention can be measured by a conventional dynamic scanning liquid-absorption tester. The absorbency of the recording medium of the present invention is preferably not less than 50 mL/m$^2$ at a liquid contact time of 25 milliseconds. Within this range, occurrence of beading can be prevented effectively independently of the ink composition. More preferably the ink absorbency is not less than 100 mL/m$^2$ at a liquid contact time of 100 milliseconds. Within this range, ink-running, ink repelling, and beading can be prevented even in multiple printing at a high speed.

The speed and amount of the liquid absorption can be adjusted to a desired level depending on the type of the pulp employed and the beating degree thereof. With the recording medium of the present invention, particularly the absorbency can be improved by addition of bulky cellulose, mercerized cellulose, fluffed cellulose, or mechanical pulp. Furthermore, the surface properties of the recording medium can be improved by addition of a fibrillated cellulose, a crystallized cellulose, a sulfate pulp, a sulfite pulp, a soda pulp, a hemicellulase-treated pulp, or an enzyme-treated chemical pulp.

The recording medium of the present invention can be produced by a conventional paper-making process. The paper machine may be any conventional paper machine such as Fourdrinier paper machines, cylinder paper machines, cylindrical drum paper machines, and twin wire paper machines.

The recording medium, in the present invention, is not coated with starch in a size-press process, which is different from the ordinary paper. Instead, an alumina hydrate and a cationic resin are employed for coating. This coating is preferably conducted by on-machine coating. The on-machine coating can be conducted in a conventional manner by employing an apparatus such as a gate roll coater, a size press, a bar coater, a blade coater, an air knife coater, a roll coater, a brush coater, a curtain coater, a gravure coater, and a sprayer. The alumina hydrate and the cationic resin may be applied mixedly, or separately in the on-machine coating.

The on-machine coated recording medium may be calendared or supercalendered for surface smoothness, if necessary, in the present invention.

The alumina hydrate employed in the present invention has a boehmite structure. An alumina hydrate containing a metal compound such as titanium dioxide and silica is also useful, provided that the alumina hydrate shows the boehmite structure in X-ray diffraction. A useful alumina hydrate of the boehmite structure containing titanium dioxide is described, for example, in Japanese Patent 2,714,351. A useful alumina hydrate of the boehmite structure containing silica is described, for example, in Japanese Patent Application Laid-Open No. 2000-79755. Further, other type of the alumina hydrate may be used which contains an oxide or compound of magnesium, calcium, strontium, barium, zinc, boron, silicon, germanium, tin, lead, zirconium, indium, phosphorus, vanadium, niobium, tantalum, chromium, molybdenum, tungsten, manganese, iron, cobalt, nickel, or ruthenium, in place of the titanium dioxide or the silica.

The shape (particle shape, particle diameter, aspect ratio) of the alumina hydrate can be measured by use of a sample prepared by dropwisely applying a liquid dispersion of the alumina hydrate in deionized water onto a collodion membrane by observation with a transmission electron microscope. Of the alumina hydrates, the one of the pseudo-boehmite type is generally known to have a cilium shape or another shape as shown in a prior art literature (Rocek J., et al.: Applied Catalysis Vol. 74, pp. 29–36 1991). In the present invention either of the cilium type and the plate shape of the alumina hydrate may be used.

The aspect ratio of the plate-shaped particles can be measured by the method defined in Japanese Patent Publication No. 5-16015. The aspect ratio is a ratio of a particle diameter to a particle thickness. The diameter herein is represented by a diameter of a circle having the same area as the projected particle area in observation with a microscope or an electron microscope. The length-breadth ratio, which is a ratio of a minimum diameter to a maximum diameter of a flat plate, can be measured in a similar manner as the aspect ratio. When the alumina hydrate is in a hair bundle shape, the aspect ratio of the alumina hydrate is represented by the ratio of the length to the diameter obtained from the top and bottom diameters of the individual needle-shaped particles of the hair bundle of the alumina hydrate regarded as a round column. The most desirable shape of the alumina hydrate has an average aspect ratio ranging from 3 to 10 and an average particle diameter ranging from 1 to 50 nm for the plate shape ones, and an average aspect ratio ranging from 3 to 10 and average particle length ranging from 1 to 50 nm for the hair bundle shape ones. Within the above aspect ratio range, interspaces are kept between the particles after the internal addition, whereby a porous structure can be formed in the alumina hydrate-containing layer with a broad pore diameter distribution. Similarly, within the above range of the average particle diameter or the average particle length, the porous structure has a large pore volume.

The alumina hydrate, in the present invention, has preferably a BET specific surface area ranging from 70 to 300 m$^2$/g. With a smaller BET specific surface area, the printed area may become white turbid, or the printed image may have insufficient water-resistance. With a larger BET specific surface area, dusting may be liable to be caused.

The BET specific surface area, the pore diameter distribution, and the pore volume can be measured by a nitrogen adsorption-desorption method.

The crystal structure of the alumina hydrate in the recording medium can be measured by a usual X-ray diffraction method. A recording medium containing the alumina hydrate internally is set into a measurement cell, and the peak of the (020) plane emerging at the diffraction angle 2θ of 14° to 15° is measured. From the diffraction angle 2θ and the half breadth B of the peak, the spacing of the (020) planes is derived according to the Bragg's equation, and the crystal thickness in the direction perpendicular to the (010) plane can be derived by the Scherrer's equation.

In the present invention, the plane spacing of the (020) planes of the alumina hydrate in the recording medium is preferably more than 0.617 nm, but is not more than 0.620 nm. Within this plane spacing range, the colorant like a dye can be selected from a broader range; the optical density of the print is higher; ink-running, beading, and ink repelling are less liable to occur with any of hydrophobic colorants and hydrophilic colorants. The optical density of the print and the printed dot diameters are uniform regardless of the type of the colorant, even combined use of a hydrophobic colorant and a hydrophilic colorant. In addition, the optical densities of the print and dot diameters are uniform even in the presence of a hydrophilic substance or a hydrophobic substance in the ink. The crystal thickness in the direction perpendicular to the (010) plane is preferably in the range from 6.0 to 10.0 nm. Within this range, the ink absorbency and the colorant adsorbency are satisfactory, and dusting is less liable to occur. The plane spacing between the (020) planes and the crystal thickness in the direction perpendicular to the (010) plane can be controlled, for example, according to the method described in Japanese Patent Application Laid-Open No. 9-99627.

Similarly, the degree of crystallization of the alumina hydrate in the recording medium can be measured by X-ray diffraction. The recording medium internally containing the alumina hydrate is pulverized and is put into the measurement cell. The peak intensity at the diffraction angle 2θ of 10° and the peak intensity at the diffraction angle 2θ of 14° to 15° are measured. The degree of crystallization is derived from the ratio of the peak intensity of the (020) plane to the peak intensity at 2θ=10°. The crystallization degree of the alumina hydrate in the recording medium is preferably in the range from 15 to 80. Within this range, the ink absorbency is improved, and the water-resistance of the printed images increased. The crystallization degree of the alumina hydrate in the recording medium can be controlled to be within the above range, for example, according to the method described in Japanese Patent Application Laid-Open No. 8-132731.

The alumina hydrate employed can have any of three types of preferred pore structures. Of these, one or more are selected as necessary.

The first type of pore structure in the present invention has an average pore radius of the alumina hydrate ranging from 2.0 to 20.0 nm, and the half breadth of the pore radius distribution ranges from 2.0 to 15.0 nm. The average pore radius herein is described in Japanese Patent Application Laid-Open Nos. 51-38298 and 4-202011. The half breadth of the pore radius distribution means the breadth of the pore radius at half the frequency of the average pore diameter in the pore diameter measurement. Within the above range of the average pore radius and the half breadth, the selection range of the applicable colorant is broad, and ink running, beading, and ink repelling hardly occur, and the optical density and the dot diameter are uniform. The alumina hydrate of the above pore structure can be produced, for example, according to the method described in Japanese Patent No. 2,714,352.

The second type of pore structure in the present invention has a maximum in the pore radius distribution in the respective ranges of less than 10.0 nm, and 10.0 to 20.0 nm. The pores having a relatively large radius of 10.0 to 20.0 nm absorb the solvent component of the ink, and the pores having a relatively small radius of less than 10.0 nm adsorb the coloring component of the colorant of the ink, which promotes both the colorant adsorption and the solvent absorption. The maximum in the radius range of less than 10.0 nm is preferably in the range from 1.0 to 6.0 nm. In this range, the colorant adsorption is promoted. The pore volume ratio of the maximum portion of the pores of the radius of 10.0 nm or less (volume ratio of the maximum 2) is preferably in the range from 0.1 to 10.0% of the total pore volume in view of the ink absorbency and the colorant fixability. More preferably this range is from 1 to 5%. Within this range, the ink absorption speed, and the colorant adsorption speed are increased. The alumina hydrate of the above pore structure can be produced, for example, according to the method described in Japanese Patent No. 2714350. In another method, the alumina hydrate having the peak at a radius of 10.0 nm and the alumina hydrate having the peak in the range of 10.0 to 20.0 nm are combinedly used.

The third type of pore structure in the present invention has the maximum in the pore radius distribution in the range of 2.0 to 20.0 nm. The alumina hydrate having a peak within this range satisfies the ink absorbency and the colorant adsorbency, having improved transparency, and preventing white turbidity of the printed image. More preferably the peak is in the range of 6.0 to 20.0 nm. Within this range, ink-running, beading, and ink repelling are prevented even if printing is conducted with a pigment ink, a dye ink, a combination or mixture of a dye ink and a pigment ink, or a mixed ink. Still more preferably, the peak is in the range of the radius of 6.0 to 16.0 nm. Within this range, the difference in tint is not recognizable even when three or more types of inks of different colorant concentrations are used. The alumina hydrate of the above pore structure can be produced, for example, according to the method described in Japanese Patent Application Laid-Open No. 9-6664.

The total pore volume of the alumina hydrate preferably ranges from 0.4 to 1.0 $cm^3/g$. Within this range, the ink absorbency is sufficient, and the tint of multicolor print is not impaired. More preferably, in the range from 0.4 to 0.6 $cm^3/g$, dusting and image bleeding are less liable to occur. Still more preferably, the pore volume of the alumina hydrate in the pore radius range of 2.0 to 20.0 nm accounts for 80% or more of the total pore volume of the alumina hydrate. With this pore distribution, the printed image does not become white turbid. Further, as another type of aluminum hydrate, the alumina hydrate may be aggregated. Preferably, the particles have a diameter of 0.5 to 50 $\mu$m, and the ratio of the BET specific surface area/pore volume of 50 to 500 $m^2$/mL. In this range, many of the adsorption points of the alumina particles are bared, preventing beading independently of the printing environment (temperature, humidity). The aggregated particles having the above pore structure can be prepared, for example, by the method described in Japanese Patent Application Laid-Open No. 8-174993.

The alumina hydrate having been treated with a coupling agent may be used in the present invention. One or more of the coupling agents may be selected from the coupling agents of silane types, titanate types, aluminum types, and zirconium types. The use of the coupling agent is preferred since the coupling agent renders the alumina hydrate hydrophobic to give a high color density and a clear image. When the coupling agent treatment is carried out for 0.1 to 30% of the entire surface of the alumina hydrate, the color developability can be increased without impairing the ink absorbency. The coupling agent treatment can be conducted, for example, by a method described in Japanese Patent Application Laid-Open No. 9-76628.

Further, in the present invention, a metal alkoxide, or a substance which is capable of bridging the hydroxyl groups may be added to the alumina hydrate. The metal alkoxide may be selected from generally used materials such as tetraethoxysilane and tetramethoxysilane. The substance capable of bridging the hydroxyl groups may be selected from boric acid, boron compounds, formalin compounds, and the like. The treatment with the substance can be conducted, for example, by a method described in Japanese Patent Application Laid-Open No. 9-86035. The addition of such a compound prevents ink-running and beading even when a highly penetrative ink containing a large amount of a surfactant is used for printing.

The cationic resin employed in the present invention may be selected from the materials such as quaternary ammonium salts, polyamines, alkylamines, halogenated quaternary ammonium salts, cationic urethane resins, benzalkonium chloride, benzetonium chloride, and dimethyldiallylammonium chloride polymerizates.

The surface resistivity of the recording medium of the present invention preferably ranges from $2\times10^{11}$ Ω/□ to $1\times10^{13}$ Ω/□. The recording medium may be electrified during delivery in the recording apparatus. Ink-jet printing onto the electrified recording medium may cause bounding of the dotted ink to generate an ink mist. Within the above surface resistivity range, the ink mist can be decreased.

The ink used in the image formation of the present invention may be composed mainly of a colorant (dye or pigment), a water-soluble organic solvent, and water.

The dye is preferably a water-soluble dye, such as direct dyes, acid dyes, basic dyes, reactive dyes, and food dyes, and combination of above dyes, which is capable of forming an image having required properties of fixability, color developability, image sharpness, stability, light-fastness, and so forth. As the pigment, carbon black, and the like are preferred. Combined use of a pigment and a dispersant, use of a self-dispersing pigment, or microcapsulation may be employed.

The water-soluble dye is generally used as a solution in water or a solvent composed of water and a water-soluble organic solvent. The solvent preferably used is a mixture of water and a water-soluble organic solvent. The water content in the ink is preferably in the range from 20 to 90 wt %.

The above water-soluble organic solvent includes alkyl alcohols of 1–4 carbon atoms such as methyl alcohol; amides such as dimethylformamide, ketonealcohols such as acetone; ethers such as tetrahydrofuran; polyalkylene glycols such as polyethylene glycol; alkylene glycols having an alkylene group of 2–6 carbon atoms such as ethylene glycol; glycerin; and lower alkyl ethers of polyhydric alcohols such as ethylene glycol methyl ether; and combinations of two or more thereof.

Of these water-soluble organic solvents, preferred are polyhydric alcohols such as diethylene glycol; and lower alkyl ethers of polyhydric alcohols such as triethylene glycol monomethyl ether, and triethylene glycol monoethyl ether. The polyhydric alcohols are preferred because they serves as a lubricant for decreasing or preventing clogging of the nozzle by evaporation of water and deposition of the water-soluble dye.

A solubilizer may be added to the ink. Typical solubilizers include nitrogen-containing heterocyclic ketones. The solubilizer serves to remarkably increase the solubility of the water-soluble dye in the solvent. For example, N-methyl-2-pyrrolidone, and 1,3-dimethyl-2-imidazolidinone are preferably used. For further improvement of the properties, there may be added additives such as a viscosity controller, a surfactant, a surface tension controller, a pH controller, and a resistivity controller.

For formation of an image on the aforementioned recording medium with the above ink, an ink-jet recording method is suitable. Any ink-jet method is applicable which discharges ink effectively through a fine nozzle onto a recording medium. A suitable ink-jet method is disclosed in Japanese Patent Application Laid-Open No. 54-59936 in which an ink is ejected through a nozzle by action of a abrupt volume change of the ink caused by a thermal energy.

The present invention is explained by reference to examples without limiting the invention.

The measurement of properties in the present invention were conducted as described below.

1. Characteristics of prints

Printing was conducted by an ultra-high speed card printer, P-400CII (manufactured by Canon Aptex K. K.) provided with a line head. The printed sample size was 99×50 mm since the card printer was used. The printing characteristics and the print properties were evaluated as below.

(1) Ink Absorbency

Solid prints were formed in single colors to four mixed colors by means of the aforementioned printer. Immediately after the printing, the printed area on the surface of the recording medium was touched with a finger to examine the dry condition of the ink for evaluation of the ink absorbency. The amount of the ink applied in the single color solid printing was taken as 100%. The recording medium which does not cause sticking of the ink to the finger at the ink amount of 300% (three color mixing) was evaluated to have "excellent" ink absorbency. The one which does not cause the ink sticking at the ink amount of 200% (two color mixing) was evaluated to have "good" absorbency. The one which does not cause the ink sticking at the ink amount of 100% was evaluated to have "fair" absorbency. The one which causes the ink sticking at the ink amount of 100% was evaluated to have "poor" absorbency.

(2) Image Density

The density of a solid print formed with an ink amount of 100% with a single color ink of Y, M, C, or Bk was measured by means of the MacBeth reflectodensitometer RD-918.

(3) Solid Print Uniformity, Ink-Running, Beading, Ink Repelling, Strike-Through

A single color or multi-color solid print pattern of 10 mm×10 mm squares formed with the above printer was examined visually for solid print uniformity, ink-running, beading, ink repelling, and strike-through. In evaluation of the solid print uniformity, the recording medium which gives uniform density of the solid print was evaluated to be "good", and the one which causes white blank, density irregularity, or streaky irregularity was evaluated to be "poor". In evaluation of ink-running, the recording medium which does not cause running of the colorant out of the printed area was evaluated to be "good", and the one which causes the running was evaluated to be "poor". Similarly, in evaluation of beading and ink repelling, the recording medium which does not cause beading or ink repelling was evaluated to be "good", and the one which causes the beading or ink repelling was evaluated to be "poor". In evaluation of strike-through, the reverse face of the recording medium was observed and strike-through of the colorant was examined visually. The recording medium which does not cause strike-through was evaluated to be "good", and the one which causes strike through was evaluated to be "poor".

(4) Curling after Printing

A pattern of solid print of 50 mm×50 mm square was formed with the 100% single color on the center portion of the recording medium by means of the above printer. The printed recording medium was left standing on a flat table, and warpage was measured with a height gauge. The recording medium which causes warpage of not more than 1 mm was evaluated to be "good", the one which causes warpage of not more than 3 mm was evaluated to be "fair", and the one which causes warpage of more than 3 mm was evaluated to be "poor".

(5) Tackiness after Printing

A pattern of solid print of 10 mm×10 mm square was formed with the 100% single color on the recording medium by means of the above printer. The surface of the recording medium was touched with a finger. The recording medium which does not cause tackiness to the finger was evaluated to be "good", and the one which causes tackiness to the finger was evaluated to be "poor".

(6) Dusting after Printing

Ten sheets of the recording medium after printing were piled, and delivered through the aforementioned printer. The dusting of the respective sheets were examined visually. The recording medium which does not cause dusting was evaluated to be "good", and the one which causes dusting was evaluated to be "poor".

(7) Sheet Sticking after Printing

A pattern of solid print of 50 mm×50 mm square was formed with the 100% single color on the center portion of the recording medium by means of the above printer. This pattern formation was conducted successively on ten sheets of the recording medium, and ten sheets were piled. The recording medium which does not cause sticking of the sheets was evaluated to be "good", and the one which causes sticking was evaluated to be "poor".

(8) Change of Surface after Printing (Swelling, Cockling, Wrinkling, and Deformation)

A pattern of solid print of 50 mm×50 mm square was formed with the 100% single color on the center portion of the recording medium by means of the above printer. Immediately after the printing, the surface of the recording medium was examined visually. The recording medium which does not cause change or deformation of the printed face was evaluated to be "good", and the one which causes swelling, wrinkling, deformation, or cockling was evaluated to be "poor".

(9) Surface Resistance of Recording Medium

The surface resistance of the recording medium was measured in the environment of 25° C. and 50% RH with a surface resistivity tester.

2. Liquid Absorption Rate

The liquid absorbency was measured with a dynamic scanning liquid absorption tester (trade name: KM350-D1, manufactured by Kyowa Seiko K.K.) by bringing a liquid into contact with a sample. The amount of the absorption was measured at contact times ranging from 10 milliseconds to 10 seconds. A liquid absorption curve was derived by plotting the liquid transfer quantity as the ordinate, and the square root of the contact time as the abscissa.

An aqueous ink having the composition below was employed as the testing liquid.

Aqueous Ink Composition (100 parts in total)

| | |
|---|---|
| Dye (C.I. Food Black 2) | 3 parts |
| Surfactant (Surfinol 465, Nisshin Kagaku K.K.) | 1 part |

-continued

| | |
|---|---|
| Diethylene glycol | 5 parts |
| Polyethylene glycol | 10 parts |
| Deionized water | balance |

EXAMPLE 1

A commercial LBKP as the source pulp was beaten by a double-disk refiner to obtain a beaten paper stock (A) having a Canadian Standard Freeness (C.S.F.) of 300 mL. Similarly, a commercial LBKP was beaten with the same apparatus as the one used for the base layer to obtain a beaten paper stock (B) having a Canadian standard freeness (C.S.F.) of 450 mL. The beaten paper stock (A) and the beaten paper stock (B) were mixed at a dry weight ratio of 9:1 to prepare a paper source stock.

An alumina hydrate liquid dispersion (solid matter content: 10 wt %) was prepared by dispersing the alumina hydrate having a boehmite structure described in Example 1 of Japanese Patent Application Laid-Open No. 9-99627 in deionized water. A cationic resin liquid dispersion was prepared by dispersing a cationic resin, Weisstex H-90 (trade name, produced by Nagase Kasei Kogyo K.K., effective component content: 45%) in deionized water. The alumina hydrate liquid dispersion and the cationic resin liquid dispersion were mixed at a mixing ratio of 1:1 to prepare an on-machine coating solution.

A paper sheet was made from the aforementioned paper source stock by controlling the basis weight to 80 g/m$^2$ with a Fourdrinier paper machine. Thereon, the on-machine coating liquid was applied by means of a two-roll size-press machine at a coating amount of 4 g/m$^2$ (alumina hydrate 2 g/m$^2$, and cationic resin 2 g/m$^2$) on one face. The sheet was supercalendered to smoothen the surface. Thus a recording medium was obtained. The hand feeling was similar to the conventional plain paper sheet. Table 1 shows the properties of the obtained recording medium.

EXAMPLE 2

A paper source stock was prepared from a crosslinking pulp (High Bulk Additive (trade name), produced by Weyerhaeuser Paper Co.) having a twisted structure as a bulky cellulose fiber by beating to obtain a beaten paper stock (C). The beaten paper stock (A) and the beaten paper stock (C) were mixed at a dry weight ratio of 9:1 to prepare a paper source stock. A paper sheet was made by the same paper machine as in Example 1 so as to have the same basis weight as in Example 1. Thereon, the same on-machine coating liquid was applied in the same manner and in the same amount as in Example 1. The sheet was smoothened in the same manner as in Example 1. Thus a recording medium was obtained. The hand feeling was similar to the conventional plain paper sheet. Table 1 shows the properties of the obtained recording medium.

EXAMPLE 3

A beaten pulp slurry having a C.S.F. of 300 mL was pulverized by means of an abrasive plate grinder, according to the method described in Example 1 of Japanese Patent Application Laid-Open No. 8-284090 and further ultrapulverized by means of a high-pressure homogenizer to obtain a beaten paper stock (D) composed of fibrillated cellulose. The beaten paper stock (A) and the beaten paper stock (D) were mixed at a dry weight ratio of 9:1 to prepare a paper source stock. A paper sheet was made by the same paper machine as in Example 1 so as to have the same basis weight as in Example 1. Thereon, the same on-machine coating liquid was applied in the same manner and in the same amount as in Example 1. The sheet was smoothened in the same manner as in Example 1. Thus a recording medium was obtained. The hand feeling was similar to the conventional plain paper sheet. Table 1 shows the properties of the obtained recording medium.

EXAMPLE 4

The beaten paper stock (A), the beaten paper stock (C), and the beaten paper stock (D) were mixed at a dry weight ratio of 8:1:1 to prepare a paper source stock. A paper sheet was made by the same paper machine as in Example 1 so as to have the same basis weight as in Example 1. Thereon, the same on-machine coating liquid was applied in the same manner and in the same amount as in Example 1. The sheet was smoothened in the same manner as in Example 1. Thus a recording medium was obtained. The hand feeling was similar to the conventional plain paper sheet. Table 1 shows the properties of the obtained recording medium.

The typical effects of the present invention are as follows.

(1) The excellent ink absorbency can be obtained without causing sheet sticking nor ink strike-through even when printing is conducted with a ultra-high speed printer having a full line head.

(2) Excellent color developability and excellent dot reproducibility can be achieved without ink strike-through even at a high speed printing, since the colorant is quickly separated at the surface of the recording medium.

(3) The recording medium of the present invention can be produced in a simple process with high productivity owing to the single layer structure of the recording medium.

(4) The recording medium of the present invention can be produced in a simple process by a conventional paper machine, since the alumina hydrate and the cationic resin can be applied by on-machine coating, with higher productivity than that of the conventional process in which the coating is conducted onto a sheet once wound up.

TABLE 1

| | Example 1 | Example 2 | Example 3 | Example 4 |
|---|---|---|---|---|
| Ink absorbency | excellent | excellent | excellent | excellent |
| Image density | | | | |
| (Y) | 1.12 | 1.14 | 1.14 | 1.15 |
| (M) | 1.11 | 1.14 | 1.13 | 1.15 |
| (C) | 1.12 | 1.14 | 1.14 | 1.15 |
| (Bk) | 1.11 | 1.13 | 1.14 | 1.15 |
| Solid print uniformity | good | good | good | good |
| Ink-running | good | good | good | good |
| Beading | good | good | good | good |
| Ink-repelling | good | good | good | good |
| strike-through | good | good | good | good |
| Curling after printing | good | good | good | good |
| Tackiness after printing | good | good | good | good |
| Dusting after printing | good | good | good | good |
| Sticking after printing | good | good | good | good |
| Surface change after printing | good | good | good | good |
| Surface resistance (Ω/□) | $3.0 \times 10^{11}$ | $4.0 \times 10^{11}$ | $3.5 \times 10^{11}$ | $3.0 \times 10^{11}$ |
| Liquid absorption rate (mL/$m^2$) | | | | |
| (Contact time: 25 msec.) | 80 | 72 | 71 | 60 |
| (Contact time: 100 msec.) | 170 | 150 | 155 | 146 |

What is claimed is:

1. A recording medium having a non-sized single-layer fibrous structure which is composed mainly of a fibrous material and contains no filler and employing a face of the single-layer fibrous structure as an ink-receiving face, wherein alumina hydrate of a boehmite structure and a cationic resin are present at least near the surface of the ink-receiving face, and wherein the single-layer fibrous structure contains at least one material selected from the group consisting of fine fibrillated cellulose; sulfate pulp, sulfite pulp, and soda pulp derived from hard wood or soft wood; hemicellulase-treated pulp; and enzyme-treated pulp.

2. The recording medium according to claim 1, which is for use in ink-jet recording.

3. The recording medium according to claim 1, wherein interstices are present between the fibrous material contained in the single-layer fibrous structure, and the alumina hydrate and the cationic resin are not present in the interstices.

4. The recording medium according to claim 1, wherein the alumina hydrate and the cationic resin are present in contact with the surface of the fibrous material.

5. The recording medium according to claim 1, wherein the recording medium is in the shape of a sheet, and the alumina hydrate is applied in an amount ranging from 1 to 5 g/$m^2$ and the cationic resin is applied in an amount ranging from 1 to 5 g/$m^2$ on one face of the sheet.

6. The recording medium according to claim 1, wherein the alumina hydrate and the cationic resin are applied by on-machine coating.

7. A process for producing the recording medium according to any one of claims 1 to 6, comprising a step of applying alumina hydrate having a boehmite structure and a cationic resin onto a base material having a single-layer fibrous structure which is mainly composed of a fibrous material and contains no filler.

8. The process according to claim 7, wherein the step of applying the alumina hydrate and the cationic resin to the base material is conducted by on-machine coating.

9. An image-forming method for printing an image by applying ink droplets onto an ink-receiving face of a recording medium, wherein the recording medium set forth in any one of claims 1 to 6 is employed as the recording medium.

10. The image-forming method according to claim 9, wherein the ink droplets are applied by ejecting micro droplets of the ink through a fine orifice.

11. The image-forming method according to claim 10, wherein the ink droplets are ejected by applying a thermal energy to the ink.

12. The recording medium according to claim 1, wherein the ink-receiving face is formed on both faces of the single-layer fibrous structure.

13. A recording medium having a non-sized single-layer fibrous structure which is composed mainly of a fibrous material and contains no filler and employing a face of the single-layer fibrous structure as an ink-receiving face, wherein alumina hydrate of a boehmite structure and a cationic resin are present at least near the surface of the ink-receiving face, and wherein the single-layer fibrous structure contains at least one cellulose selected from the group consisting of mercerized cellulose, fluffed cellulose, bulky cellulose, and mechanical pulp.

14. The recording medium according to claim 13, which is for use in ink-jet recording.

15. The recording medium according to claim 13, wherein interstices are present between the fibrous material contained in the single-layer fibrous structure, and the alumina hydrate and the cationic resin are not present in the interstices.

16. The recording medium according to claim 13, wherein the alumina hydrate and the cationic resin are present in contact with the surface of the fibrous material.

17. The recording medium according to claim 13, wherein the recording medium is in the shape of a sheet, and the alumina hydrate is applied in an amount ranging from 1 to 5 g/$m^2$ and the cationic resin is applied in an amount ranging from 1 to 5 g/$m^2$ on one face of the sheet.

18. The recording medium according to any one of claim 13, wherein the alumina hydrate and the cationic resin are applied by on-machine coating.

19. The recording medium according to claim 13, wherein the ink-receiving face is formed on both faces of the single-layer fibrous structure.

* * * * *

UNITED STATES PATENT AND TRADEMARK OFFICE

CERTIFICATE OF CORRECTION

PATENT NO. : 6,706,340 B2
DATED : March 16, 2004
INVENTOR(S) : Hitoshi Yoshino et al.

It is certified that error appears in the above-identified patent and that said Letters Patent is hereby corrected as shown below:

Title page,
Item [56], References Cited, FOREIGN PATENT DOCUMENTS,
"JP 54-51583 A 4/1980" should read -- JP 55-51583A 4/1980 --.

Column 1,
Line 48, "medium" should read -- mediums --.

Column 2,
Line 8, "improves" should read -- improve --.

Column 11,
Line 55, "serves" should read -- serve --.

Column 12,
Line 7, "a abrupt" should read -- an abrupt --.
Line 63, "strike through" should read -- strike-through --.

Column 13,
Line 19, "were" should read -- was --.

Column 15,
Line 25, "nor" should read -- or --.
Line 26, "a ultra-high" should read -- an ultra-high --.
Line 54, "strike-through" should read -- Strike-through --.

Signed and Sealed this

Twenty-seventh Day of July, 2004

JON W. DUDAS
*Acting Director of the United States Patent and Trademark Office*